A. G. HUPFEL.
COMBINED HOP EXTRACTOR AND PRESS.
APPLICATION FILED APR. 11, 1913.
1,119,512.
Patented Dec. 1, 1914.
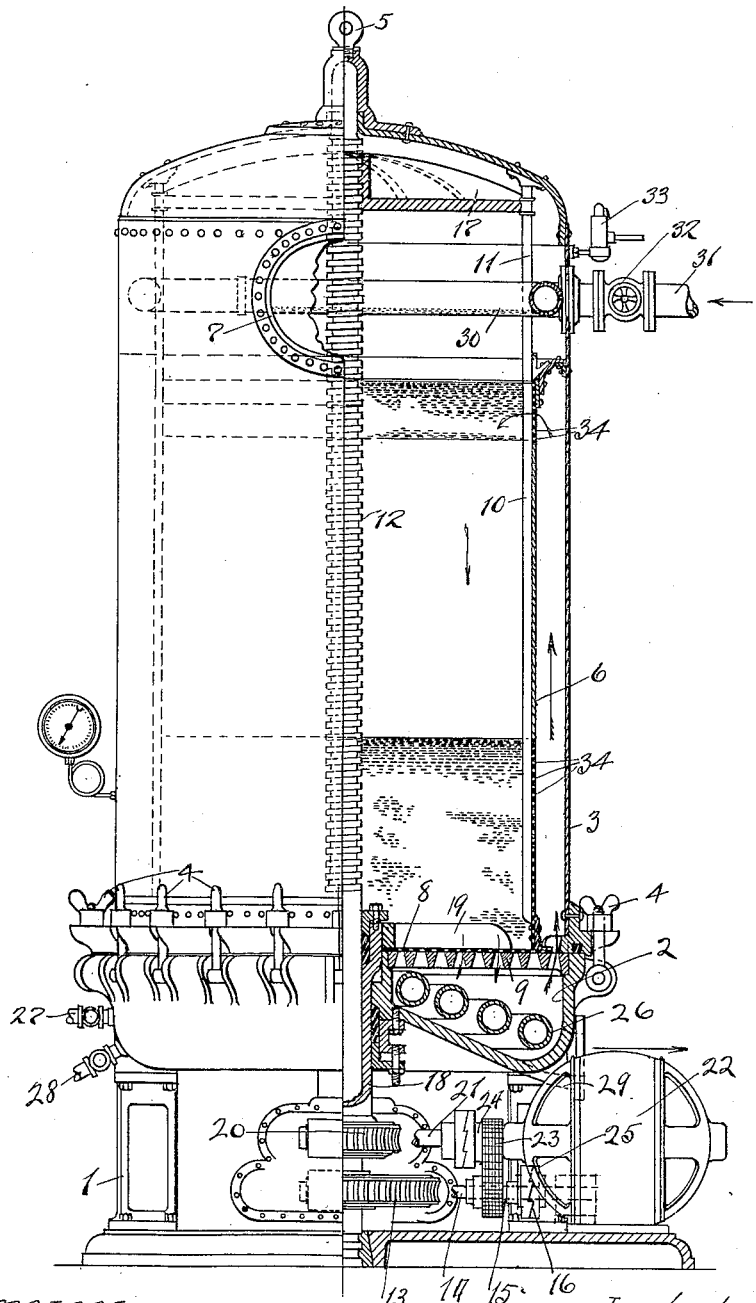

UNITED STATES PATENT OFFICE.

ADOLPH G. HUPFEL, OF NEW YORK, N. Y.

COMBINED HOP EXTRACTOR AND PRESS.

1,119,512.   Specification of Letters Patent.   Patented Dec. 1, 1914.

Application filed April 11, 1913. Serial No. 760,390.

*To all whom it may concern:*

Be it known that I, ADOLPH G. HUPFEL, a citizen of the United States, and a resident of New York city, county of New York, and State of New York, have invented a new and useful Improvement in Combined Hop Extractors and Presses, of which the following is a specification, the principle of the invention being herein explained and the best mode in which I have contemplated applying that principle, so as to distinguish it from other inventions.

The subject of the present invention is a hop extractor and press for use in beer brewing.

The present machine has been designed to perform a number of steps in the process, being adapted to receive the hops and wort, and boil the same, and also to press the hops after the desired elements have been removed.

To the accomplishment of these and related ends said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

The single figure is a side elevation partially in section of my improved apparatus.

The present invention consists of a suitable base 1 which is formed at its upper end with a hollow chamber 2 which is adapted to be covered by means of a cylindrical casing 3 or dome-like form which will be removably attached to the base by means of butterfly nuts 4. The casing is provided with an eyelet 5 at its upper end which may be engaged by a hoist in order to raise the casing from off the base to an extent sufficient to permit of the removal of the solid material in the casing. Within the outer casing 3 there is disposed a similarly shaped inner casing 6 having its sides spaced from the sides of the outer casing and extending from the bottom of the latter to a point intermediate the ends of the outer casing, such point being just below a manhole 7 formed in the outer casing for the introduction of the material to be treated. The casing 6 is provided at its upper and lower ends with a number of small perforations 34 adapted to permit the passage therethrough of fluids but not of solid material such as hops. This inner tubular casing 6 rests upon a perforated plate 8 disposed upon an open grid 9, the grid extending across the bottom of the outer casing between the casing and the chamber formed in the base 1. The perforated plate 8 does not extend to the sides of the outer casing, thus permitting a circulation of the liquid material in the apparatus upward from the chamber 2 in the base through the space between the walls of the inner and outer casings, as will be described in detail hereinafter.

Mounted upon the inner side of the inner tubular casing 6 are a plurality of guide rods 10 which extend to the top of such casing, at which they are met by complementary, alined guides 11 which are attached to the outer casing and extend downward from the dome of the same. Extending through the center of the base is a screw 12 which is journaled in the base and in the center of the dome of the outer casing, the upper end of the screw 12 which is journaled in the dome being slidably mounted therein to permit of the raising of the outer casing. In the lower portion of the base a gear 13 is attached to the screw, such gear being engaged by a worm (not shown) formed on a shaft 14 which may be attached to a driving shaft 15 by means of a clutch 16 of any suitable type. Mounted on the screw 12 and restrained from rotation by reason of its engagement with the guides 11 is a plunger press 17 which is adapted to be moved downwardly by rotation of the screw in one direction, thus forcing all solid material against the perforated plate 8 in the inner cylinder, the press being adapted to fit snugly within the inner casing. Rotatably mounted about that portion of the screw which is beneath the upper surface of the base is a sleeve 18 which extends through the base concentric with the screw and has attached to it, just above the perforated plate, an agitator 19 consisting of a plurality of radialy extending blades. A second gear 20 is attached to the sleeve in the lower portion of the base and is engaged by a second worm (not shown) on a shaft 21 which may be driven from an electric motor 22 when connected thereto by a clutch 24. The motor shaft 21 is connected to the shaft 15 by means of a driving chain 23.

In the chamber formed in the base there is disposed a steam coil 26 having suitable inlet and outlet pipes 27 and 28 respectively. An outlet port 29 from this chamber is provided at the lowest point of the same for the purpose of drawing off the liquids which will pass into this chamber through the perforated plate. The outer casing is provided at its upper portion with a perforated circular tube 30 the perforations being so disposed that liquid passing through them will fall into the casing, the tube being connected by a suitable pipe 31 controlled by a valve 32 with a source of supply. A safety valve 33 is also attached to the outer casing.

In the operation of the machine the hops will first be placed in the inner casing through the manhole in the outer casing, and the first wort will then be run into the casing through the circular pipe, thus sprinkling down over the hops in the inner casing into the base, and filling the space between the two casings to a predetermined level. Heat is then applied by means of the steam coil, until the liquid is brought to boiling thus causing a circulation of the wort upwardly through the space between the casings and downwardly through the hops in the inner casing which will secure the extraction of the desired element from the hops. After the operation has been continued for a proper length of time, the kettle wort is sparged over the hops in the casing and combined mixture is drawn off from the chamber in the base and a fresh supply is run in for the purpose of removing whatever remains of the desired element in the hops. As the wort is run off, the screw 12 is rotated, thus forcing down the plunger 17, compressing the hops in the inner casing against the perforated plate and expressing any liquid that may be left in the body of the hops. If desired hot water may be sparged over the hops prior to pressing for the purpose of removing the last traces of the extract desired in the finished product. When this wort has been run off the press is operated to force the hops against the perforated plate 8 and the outer casing is lifted by any suitable means a slight distance above the base. Rotation of the agitator will now eject the hops clear of the base on all sides of the apparatus, the press being continuously operated to force the hops down the sides of the inner casing to the agitator.

When it is desired to clean the machine the outer casing may be lifted from the base, and the perforated plate and the grid can both be removed, as the grids and the perforated plate are preferably made in sections.

It will be understood that the agitator is kept in motion during the period of boiling for the purpose of properly circulating the contents of the casing which the heat alone is insufficient to do by reason of the heavy nature of that liquid.

I therefore particularly point out and distinctly claim as my invention:—

1. In apparatus of the character described, the combination of a casing open at its bottom; a fixed base, said casing being removably mounted thereon; and rotatable agitating means disposed adjacent the bottom of said casing and adapted to eject the contents of the same when said casing is raised from said base.

2. In apparatus of the character described, the combination of a suitable fixed base; a cylindrical casing open at its bottom, said casing being removably mounted on said base, said base closing such bottom of said casing; a plunger reciprocably mounted in said casing and adapted to force the contents toward said base; and rotatable agitating means disposed in said casing adjacent said base and adapted to eject the contents of said casing, when the latter is raised.

3. In apparatus of the character described, the combination of a suitable fixed base; a cylindrical casing open at its bottom, said casing being removably mounted on said base, said base closing such bottom of said casing; a plunger reciprocably mounted in said casing and adapted to force the contents toward said base; and an agitator rotatably mounted in said base and extending into said casing, said agitator being adapted to eject the contents of said casing when the latter is raised.

4. In apparatus of the character described, the combination of a suitable base; a cylindrical casing open at its bottom, said casing being removably mounted on said base, the latter closing such bottom of said casing; an inner cylindrical casing mounted in said first-named casing and having perforated sides spaced from the sides of said first-named casing, said inner casing extending from said base to a point intermediate the ends of said first-named casing; complementary guides mounted on said first-named and said inner casings; a plunger slidably mounted on said guides; and means for reciprocating said plunger, whereby said solid material in said inner casing is compressed against said base and the fluids expressed through the perforations in the sides of said inner casing.

5. In apparatus of the character described, the combination of a suitable base; a cylindrical casing open at its bottom, said casing being removably mounted on said base, the latter closing such bottom of said casing; an inner cylindrical casing mounted in said first-named casing and having perforated sides spaced from the sides of said first-named casing, said inner casing extending from said base to a point intermediate the ends of said first-named casing; complementary alined guides mounted on the inside of said first-named and said inner casings; a screw rotatably mounted in said base and extending into said inner casing; a plunger operatively engaged by said screw, said plunger engaging said guides and being thereby restrained from rotation; a sleeve rotatably mounted in said base concentric with said screw; and an agitator mounted on said sleeve and adapted to be operated thereby.

6. In apparatus of the character described, the combination of a fixed chambered base, a casing open at its bottom, said casing being removably mounted on said base; a perforated plate mounted between said base and said casing, said plate closing such bottom of said casing; and rotatable agitating means disposed above said plate, adapted to eject the contents of said casing when the latter is raised.

7. In apparatus of the character described, the combination of a fixed chambered base; a casing open at its bottom, said casing being removably mounted on said base; a perforated plate mounted between said base and said casing, said plate closing such bottom of said casing; a plunger reciprocably mounted in said casing and adapted to force the contents toward said plate; and rotatable agitating means mounted in said base and extending above said plate, said agitator being adapted to eject the contents of said casing when the latter is raised.

8. In apparatus of the character described, the combination of a base having a chamber open at its top; a casing open at its bottom and removably mounted on said base to cover such open chamber therein; a perforated plate mounted between said base and said casing; a tubular inner casing mounted in said first-named casing on said plate extending to a point intermediate the ends of said first-named casing, said inner casing having perforated sides, whereby solid material may be retained in said inner casing against said perforated plate and fluids permitted to pass therefrom.

9. In apparatus of the character described, the combination of a base having a chamber open at its top; a casing open at its bottom and removably mounted on said base to cover such open chamber therein; a perforated plate mounted on said base, said plate separating the chamber in said base from the interior of said casing but stopping short of the sides of the latter; a tubular inner casing mounted in said first-named casing on said plate and extending to a point intermediate the ends of said first-named casing, said inner casing having perforated sides, whereby solid material may be retained in said inner casing against said perforated plate and fluids permitted to pass therefrom.

10. In apparatus of the character described, the combination of a base having a chamber open at its top; a casing open at its bottom and removably mounted on said base to cover such open chamber therein; a perforated plate mounted on said base, said plate separating the chamber in said base from the interior of said casing but stopping short of the sides of the latter; a tubular inner casing mounted in said first-named casing on said plate and extending to a point intermediate the ends of said first-named casing, said inner casing having perforated sides, whereby solid material may be retained in said inner casing against said perforated plate and fluids permitted to pass therefrom; and heating means disposed in said base and adapted to heat the fluids entering through said perforated plate, thereby causing the fluids to circulate upward between said inner casing and the sides of the outer casing and to pass downward through the solid material retained in said inner casing.

11. In apparatus of the class described, the combination of a base having a chamber open at its top; a casing open at its bottom and removably mounted on said base to cover such open chamber therein, said casing having an aperture in its upper portion through which material may be introduced; an open grid disposed between said casing and said base; a perforated plate mounted on said grid, said plate stopping short of the sides of said casing; a tubular inner casing mounted on said plate and extending to a point beneath such opening in said first-named casing, said inner casing having perforated sides; complementary alined guides mounted on said first-named casing and said inner casing; a screw rotatably mounted in said base and extending into said inner casing; a plunger operatively engaged by said screw and engaging said guides thereby being restrained from rotation, said plunger being adapted upon reciprocation to compress solid material in said inner casing against said plate, thereby expressing the fluids therefrom; a sleeve rotatably and concentrically mounted about said screw in said base and extending into said inner casing; an agitator attached to said sleeve adjacent said plate in said inner casing; independent driving means for said screw and said sleeve; and heating means disposed in the chamber in said base.

12. In apparatus of the class described, the combination of a chambered base; an outer casing mounted on said base; an inner casing mounted within said outer casing and having its walls spaced therefrom, such space having free communication with the chamber in said base, and a perforated plate disposed between said casings and the chamber in said base.

13. In apparatus of the class described, the combination of a chambered base; an outer casing mounted on said base; an inner casing mounted within said outer casing and having its walls spaced therefrom, said casing being removable from said base, and such space having free communication with the chamber in said base; and a perforated plate disposed between said casing and the chamber in said base.

14. In apparatus of the class described, the combination of a base; an outer casing mounted on said base; an inner casing mounted within said outer casing and having its walls spaced therefrom, said inner casing having vertically spaced perforations, whereby circulation up one side of said inner casing and down the other is permitted; and means adapted to heat the contents of said outer casing.

15. In apparatus of the character described, the combination of a suitable base; a cylindrical casing open at its bottom, said casing being removably mounted on said base, the latter closing such bottom of said casing; an inner cylindrical casing mounted in said first-named casing and having perforated sides spaced from the sides of said first-named casing, said inner casing extending from said base to a point intermediate the ends of said first-named casing; complementary alined guides mounted on the inside of said first-named and said inner casings; a screw rotatably mounted in said base and extending into said inner casing; a plunger operatively engaged by said screw, said plunger engaging said guides and being thereby restrained from rotation; a sleeve rotatably mounted in said base concentric with said screw; an agitator mounted on said sleeve and adapted to be operated thereby; and independent means for operating said screw and said sleeve.

Signed by me, this 8th day of April, 1913.

ADOLPH G. HUPFEL.

Attested by—
MAGNUS JEPEEN,
AUTH C. G. HUPFEL.

Copies of this patent may be obtained for five cents each, by addressing the "Commissioner of Patents, Washington, D. C."